Patented Dec. 8, 1953

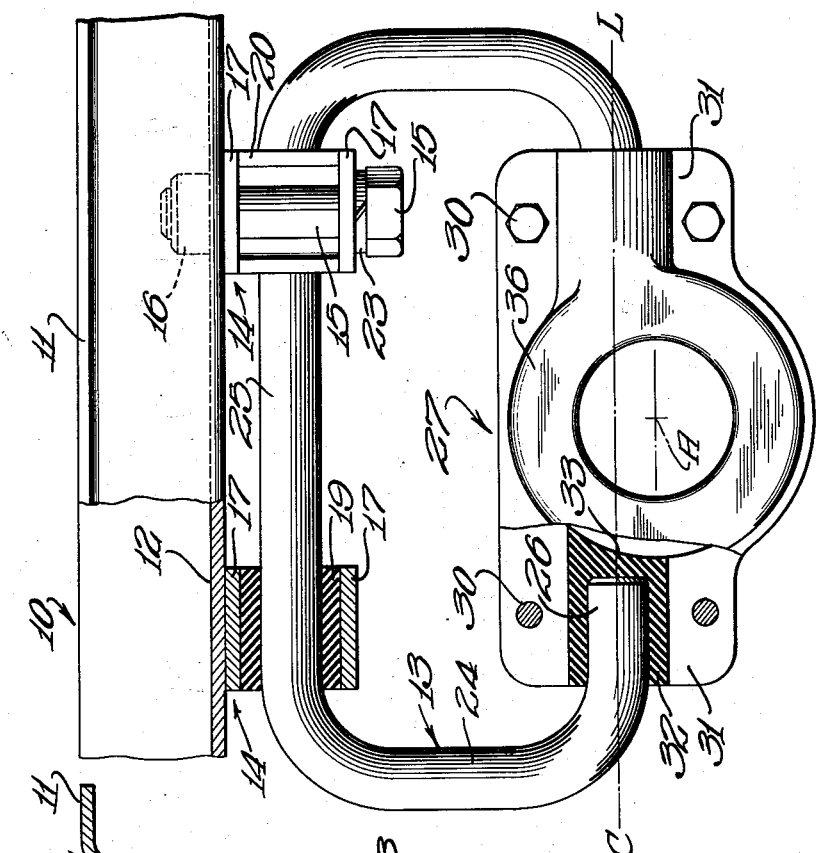

2,661,986

UNITED STATES PATENT OFFICE 2,661,986

RESILIENTLY MOUNTED SHAFT HANGER

Edward J. Herbenar, Detroit, Mich., assignor to Thompson Products, Inc., Cleveland, Ohio, a corporation of Ohio Application February 5, 1951, Serial No. 209,445

1 Claim. (Cl. 308—28)

This invention relates to a resiliently mounted shaft hanger, and more particularly to a bearing housing shaft hanger having pre-loaded rubber bushings in all of the joints between the hanger, the supporting frame and the bearing housing, whereby forces tending to displace the bearing housing are accommodated by distortion of the rubber of the bushings, imparting limited universality of movement to the housing.

It is an object of this invention to provide a resilient hanger assembly for mounting a bearing housing for a driven shaft, so arranged and constructed as to facilitate installation of the assembly and repairs thereto or replacement thereof.

It is a further important object of this invention to provide a simple and rugged resiliently mounted hanger assembly for a driven shaft, in which limited universality of movement of the shaft and bearing housing are accommodated through distortion of the rubber of the pre-loaded rubber bushings that provide the resilient mounting of the assembly.

Other and further important objects of this invention will become apparent from the following description and appended claim.

On the drawings:

Figure 1 is a broken elevational view, with parts broken away and in section, illustrating a resilient shaft hanger assembly embodying the principles of my invention.

Figure 2 is an elevational view, taken substantially at right angles to the view shown in Figure 1, with parts broken away and in section and with the shaft shown in dotted lines.

Figure 3 is a sectional view taken substantially along the line III—III of Figure 2.

As shown on the drawing:

The reference numeral 10 indicates generally a channel-shaped frame or supporting member, forming a part of the chassis or underframe of an automotive vehicle. As shown, the frame 10 has its open side facing upwardly and is provided with laterally extending flanges 11, 11 running lengthwise of said open side, while the closed side of said channel is formed by the web portion 12, which normally lies in a substantially horizontal plane. It will be understood that other forms and dimensions of supporting frame may be employed, but my present invention is especially suited for installation from a channel member closed on its lower side.

The reference numeral 13 indicates generally the hanger and bearing housing assembly of my invention, arranged for suspension from the closed bottom side 12 of the channel 10. A pair of mounting brackets 14, 14 are provided to effect the suspension of the assembly 12. Each of said brackets 14 includes a stud 15 which passes through suitable apertures (not shown) in the closed web portion 12 and is attached thereto by means of a nut 16. The shaft of the stud 15 also passes through the spaced legs 17, 17 of a U-shaped strap 18, in the bight of which is positioned a pre-loaded rubber bushing 19. A U-shaped spacer member 20 partially encloses and extends along the shaft of the stud 15, with its closed loop portion 21 held against the pre-loaded rubber bushing 19 by the shaft of said stud 15. The portion of the loop 21 that is in contact with the stud shaft 15 is contoured, as at 22, to conform with the cylindrical surface of the shaft of the stud. A lock washer 23, between the head of the stud 15 and the lower length 17 of the U-shaped strap 18 holds the bracket sub-assembly in assembled condition.

A C-shaped hanger 24 is mounted from the channel frame 10 by means of a plurality, in this case two, of bracket sub-assemblies 14, the long side 25 of the hanger being resiliently mounted in the pre-loaded bushings 19, with the hanger in a generally vertical plane. Said hanger 24 is preferably formed of an integral cylindrical bar, bent into the form of a C, with its short end portions 26 lying in spaced, opposed and aligned relationship. A shaft bearing housing, indicated generally by the reference numeral 27, is mounted between said short end portions 26 for journalling a driven shaft 28. Said bearing housing 27 is formed of a pair of mating, stamped metal shells 29, 29, held together by means of bolts 30. The shells 29, 29, together, provide aligned socket portions 31, 31, the centerline C—L of which is offset from the axis A of the bearing housing, or shaft. As illustrated, the centerline C—L lies above the axis A, but it will be understood that the bearing housing may be inverted to bring the axis A above the centerline.

A preloaded rubber bushing 32 is positioned in each of the sockets 31 for resiliently mounting the short ends 26 of the hanger. Each of said rubber bushings 32 is closed at its inner end, as at 33, and, in general, resembles a thimble.

While a specific form of bearing housing is not a part of the present invention, it is illustrated as an anti-friction bearing provided with a ball race 34, the inner race 35 of which is suitably affixed to the shaft 28 between outer flanged members 36, 36, the axially extending flanges of which extend into openings in the bearing housing shells 29, 29, provided for that purpose. An assembly 37 of felt and metal rings is positioned on the inside of each of the shells 29 to keep dirt or other foreign matter from entering the space occupied by the ball bearing race 34. The bearing housing 27 is thus of the sealed type.

The construction of the bearing housing and hanger assembly above described provides for resilient mounting of the bearing housing and for ease of assembly and adjustment thereof. As will be apparent, the closed loop end of the bracket straps 18 may be positioned on either side of the stud 15, or the stud itself may be moved laterally with respect to the median plane of the channel frame 10, if lateral adjustment is required. In order to vary the spacing of the axis A from the channel frame 10, it is only necessary to employ a C-shaped hanger having the desired dimensions between the parallel long and short end portions. Alternatively, the bearing housing 27 may be inverted to position its axis A above the centerline C—L, instead of below it, if this amount of adjustment is desired.

The provision of pre-loaded rubber bushings in all the joints between the hanger and the supporting frame and between the hanger and the shaft bearing housing not only accommodates movement of the housing relative to the frame but also eliminates all metal-to-metal contact at the joints, since, of course, the frame, bracket subassemblies, hanger and housing are all normally made of metal or a metal alloy.

It will be understood that modifications and variations may be effected without departing from the scope of the novel concepts of the present invention.

I claim as my invention:

A resilient shaft hanger comprising a plurality of supporting brackets, each including a U-shaped metal strap, a bolt and a metal spacer between the legs of said strap having a portion conforming to said bolt and extending lengthwise and laterally of said bolt, an integral metal bar bent in the form of a C having a long portion extending through said brackets and having parallel short portions terminating in spaced opposed ends, a metal bearing housing for a driven shaft between said ends having aligned sockets for receiving said ends, a pre-loaded rubber bushing in each of said brackets between the bight of said strap and said metal spacer and completely encircling said long portion, and a pre-loaded rubber bushing in each of said sockets providing a thimble-shaped recess for one of said ends, whereby limited universality of movement of said bearing housing is accommodated wholly through distortion of the rubber of said bushings.

EDWARD J. HERBENAR.

References Cited in the file of this patent

UNITED STATES PATENTS

| Number | Name | Date |
|---|---|---|
| 1,871,116 | Cummings | Aug. 9, 1932 |
| 2,450,279 | Guy | Sept. 28, 1948 |